Figure 1:
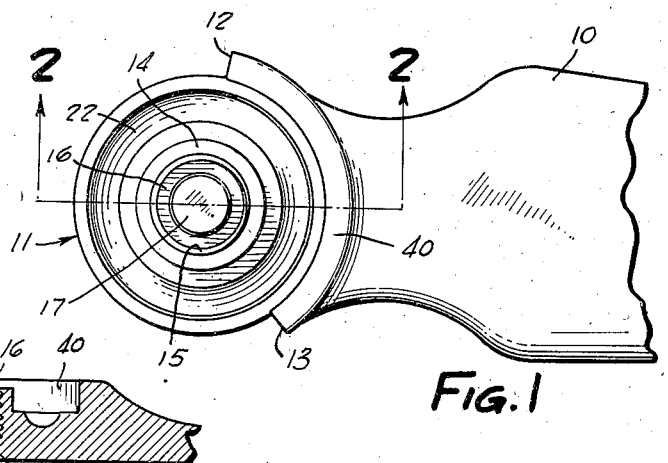

Oct. 25, 1938. J. J. McCANN 2,134,288

HINGE JOINT FOR ARTIFICIAL LIMBS

Filed Sept. 5, 1936

INVENTOR.
JOHN J. McCANN
BY Joshua R. Potts
ATTORNEY.

Patented Oct. 25, 1938

2,134,288

UNITED STATES PATENT OFFICE 2,134,288

HINGE JOINT FOR ARTIFICIAL LIMBS

John J. McCann, Burlington, N. J.

Application September 5, 1936, Serial No. 99,601

1 Claim. (Cl. 287—101)

This invention relates to hinge joints such as are commonly employed in artificial limbs.

Ordinarily one of these joints comprises a pair of hinge members each of which is formed at one end with a knuckle. One of the knuckles has an upwardly extending sleeve which is interiorly threaded, while the other knuckle fits about the said sleeve. These knuckles are formed with a pair of complemental grooves which together define a ball race in which are located ball bearings.

The knuckle member which is disposed about the sleeve on the first mentioned knuckle member is provided with a seat in which is located a thrust bearing, and a screw stem has an enlarged head which engages the thrust bearing. This stem is ordinarily screwed into the threaded sleeve to maintain the joint in assembled relationship.

Joints which are characterized as having the above outlined structure are common and well-known in the art, and those skilled in this art have long recognized the need for guarding against any accidental unscrewing of the screw stem, as this would cause a disassembly of the hinge joint, which might be accompanied with disastrous results.

Accordingly, various means have been proposed for locking the screw stem against rotation after the same has been threaded into proper position which maintains the joint assembled. Generally speaking, this means has taken one of two forms, either a set screw has been employed, or mechanism provided for expanding the stem, which is made of a split construction so as to bind the threads.

The situations involving a set screw may be briefly dismissed as being undesirable in that the head of the screw stem is ordinarily designed to engage a thrust bearing, and this arrangement does not readily lend itself to the use of a set screw. The devices which provide for a binding of the threads by the expanding of a split stem present certain undesirable factors in that it is not practical to have the parts fit accurately and closely together when this arrangement is to be used, as the expansion of the stem will interfere with the operation of the hinge joints if they are fitted with the degree of nicety which is extremely desirable in this art.

This obtaining of an accurate interfit between the knuckles comprising the hinge joint is important, as it provides for a proper transmission of stresses and strains which are taken by the joint throughout the entire structure, rather than a few individual parts which might be weakened under continued service conditions.

With the foregoing conditions in mind, this invention has in view as an important objective the provision of a hinge joint of the character described which includes a screw stem for maintaining the joint assembled, and which screw stem is formed with a tapered bore. The knuckle member into which the stem is threaded is provided with a conical plug which is complemental to the tapered bore. This conical plug and tapered bore cooperate to set up a wedging action between the parts which normally inhibits accidental unscrewing of the screw stem as the latter has been threaded home.

This invention contemplates an arrangement in which the stem is maintained unsplit so as not to set up any expanding action. The taper of the bore and plug is relatively small but serves to cause a wedging or binding between these parts, and at the same time the threads on the exterior of the stem cooperate to set up the wedging and binding, and due to the cooperation, increase to a certain extent the friction on these threads. As a result, a good locking action is obtained.

An important advantage of the present invention is that by eliminating any expanding action in a joint of this type it is possible to machine the parts of the knuckles which interfit with a degree of nicety heretofore unattained. As a result, the interfitting parts are in substantial engagement with one another, and serve to properly transmit the stresses and strains through the joint.

A somewhat more detailed object of the present invention lies in the particular manner of assembling the tapered plug in the knuckle with which it is associated. In accordance with this invention, this plug is threaded into an opening which is somewhat enlarged at the surface of the knuckle, and then riveted to enlarge the head of the plug. Spots are then drilled about the periphery of the plug head, and a suitable brazing material is filled in these spots to prevent rotation of the plug with respect to the knuckle. For all effective purposes the plug is thus constituted an integral part of the knuckle.

Various other more detailed objects of the invention will in part become apparent, and in part be hereinafter stated, as the description of the invention proceeds.

The invention, therefore, comprises a hinge joint for artificial limbs which consists of a pair of hinge members each formed with a knuckle at one end. One of these knuckles is formed with a sleeve which projects into the opening in the other knuckle with a tight fit. The sleeve is interiorly threaded, and at the lower end disposed therewithin is a slightly conical plug. A screw stem having an enlarged head which engages a thrust bearing on the second mentioned knuckle member is threaded into the sleeve, and this stem is provided with a tapered bore which is complemental to the conical plug. The bore and plug cooperate to provide a lock nut effect on the stem, when the latter is threaded home. The two knuckles are formed with complemental grooves which together define a ball race, and ball bearings are located in this race.

Figure 2:
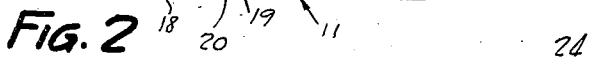
Figure 3:
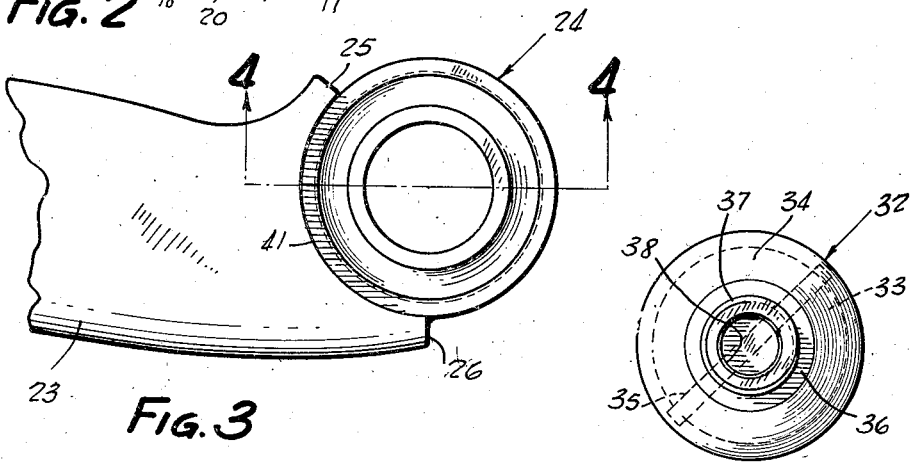
Figure 5:
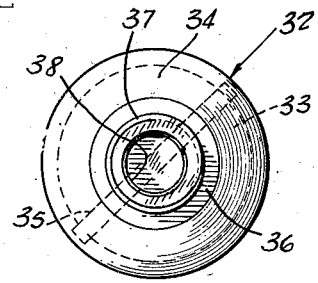
Figure 6:
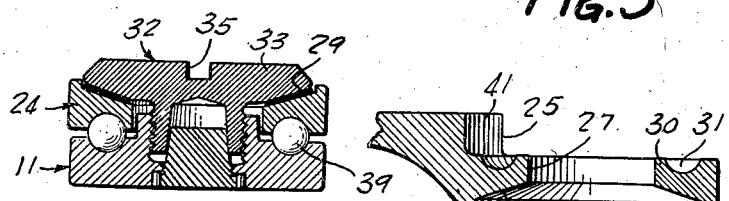
Figure 4:
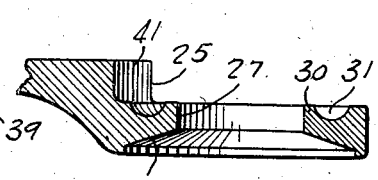

For a full and more complete understanding of the invention, reference may be had to the following description and accompanying drawing wherein Figure 1 is a top plan view in side elevation of one hinge member and knuckle at the end thereof, Figure 2 is a fragmentary vertical section taken about on the plane represented by the line 2—2 of Figure 1, Figure 3 is a view similar to Figure 1 of the other hinge member, Figure 4 is a vertical section taken about on the plane represented by the line 4—4 of Figure 3, Figure 5 is a plan view of the screw stem looking from the bottom, and Figure 6 is a transverse section taken through the two knuckle members when the joint is assembled. In this view the taper of the ball and conical plug is exaggerated to more clearly bring out the relationship of these parts.

Referring now to the drawing, wherein like reference characters denote corresponding parts, there is shown in Figure 1 a hinge member which is identified as 10, and which is formed at one end with a knuckle referred to generally by the reference character 11. Adjacent to the knuckle 11 the hinge member 10 is formed with a pair of shoulders 12 and 13 which limit the swinging action of the joint in a manner to be hereinafter described in detail.

Referring now more particularly to Figure 2, the knuckle 11 is shown as formed with an opening that is continued through an upwardly extending sleeve 14, the opening and sleeve being interiorly threaded, as indicated at 15. Adjacent to the lower end the opening which defines the bore of the sleeve 14 and extends through the knuckle 11 is reduced in diameter, as indicated at 16, and this reduced portion is also threaded.

At the bottom face of the knuckle 11 the opening is again enlarged. A plug member identified as 17 is of a conical formation, and is threaded into the restricted portion 16 with the conical plug disposed within the opening in the knuckle 11 and extending slightly into the sleeve 14, as shown in Figure 2.

After the plug member 17 has been threaded into the proper position, the head thereof is riveted to enlarge the same; the enlarged head being indicated at 18. Around the peripheral edge of the head 18 spots are drilled in this head and the knuckle 11, the spots being shown at 19. These spots are filled with some brazing material, as indicated at 20, to prevent relative rotation between the plug and the knuckle. As a result of this arrangement, the plug 17 is constituted an integral part of the knuckle 11.

The surface surrounding and from which the sleeve 14 upstands is identified as 21, and this surface is formed with a circular groove 22 which is designed to constitute a part of a ball race, in a manner to be hereinafter described.

Referring now more particularly to Figures 3 and 4, a second hinge member is identified as 23, and formed at one end with a knuckle 24 with shoulders 25 and 26 which corresponds to shoulders 12 and 13 on the hinge member 10.

The knuckle 24 is formed with an opening 27 which is designed to receive the sleeve 14 of the knuckle 11. At the upper face of the knuckle 24 the opening 27 is enlarged to provide a conical seat 28 which receives a thrust bearing shown at 29 in Figure 6. Surrounding the opening 27 is a surface 30 which is formed with a groove 31 which cooperates with the groove 22 of the knuckle 11, to define a ball race.

Referring now more particularly to Figure 5, a screw stem is referred to in its entirety by the reference character 32, and is shown as comprising a head 33, the under surface of which is of a conical formation complemental to the seat 28, this conical surface being identified as 34.

The upper face of the head is provided with a slot 35 which is designed to receive a tool, such as a screw driver. The screw stem proper is shown at 36, and is exteriorly threaded, as indicated at 37. This stem 36 is formed with a bore, identified as 38, which is of a tapered formation and complemental to the conical plug 17.

Referring now more particularly to Figure 6, wherein the taper of the bore 38 and the conical plug 17 is somewhat exaggerated, the knuckles 11 and 24 are shown in assembled relationship. It is notable that the grooves 22 and 31 define a ball race in which are disposed ball bearings 39.

When the screw stem 32 is threaded into the threads 15, and the screwing action continued, the surfaces of the tapered bore 38 and conical plug 17 engage, and further screwing up causes a wedging and binding of these parts, so that when the parts are in the assembled relationship shown in Figure 6 any accidental unscrewing of the screw stem member 32 is guarded against by the lock nut effect of this wedging action.

It is notable that the exterior surface of the sleeve 14 and the surface of the opening 27 are very accurately machined, for with the locking arrangement provided there is no locking of these parts combined. Also, the exterior surfaces of the knuckles 11 and 24 are very accurately machined, and the shoulders at 40 and 41 with which they engage. This accurate machining insures of a proper transmission of stresses and strains through the joint without the weakening of any particular parts.

This accurate machining of parts and the operation thereof without interference from any expanding action of the locking parts 17 and 32 is attributed to the fact that the effective engagement of the screw stem 32 with the plug 17 occurs well within the structure of the knuckle 11, thus any tendency to expand is solidly resisted by the substantial structure of the knuckle.

While a preferred specific embodiment of the invention is hereinbefore set forth, it is to be clearly understood that I am not to be limited to the exact construction illustrated and described, because various modifications of these details may be provided in putting the invention into practice within the purview of the appended claim.

I claim:

A hinged joint of the character described, comprising a pair of hinged members, each formed with a knuckle at one end, one of said knuckles being formed with an opening which is interiorly threaded, said knuckle carrying a sleeve with the threaded opening continued therethrough, the second knuckle being formed with an opening receiving the said sleeve, a headed screw member having a head engaging the last mentioned knuckle about the opening therein, and a stem having a continuous outer cylindrical surface, which is threaded, with the threads in engagement with the interior threads in said sleeve and opening, said stem being formed with a tapered bore, and a conical plug carried by said first mentioned knuckle engaging the tapered bore of the said stem within the opening in the said first mentioned knuckle.

JOHN J. McCANN.